United States Patent
Akizawa et al.

(10) Patent No.: US 10,530,495 B2
(45) Date of Patent: Jan. 7, 2020

(54) OPTICAL RECEIVER, OPTICAL TRANSCEIVER USING THE SAME, AND CONTROL METHOD OF RECEPTION OF OPTICAL SIGNALS

(71) Applicant: Fujitsu Optical Components Limited, Kawasaki-shi, Kanagawa (JP)

(72) Inventors: Masaru Akizawa, Musashino (JP); Naoki Kuwata, Yokohama (JP); Toshio Ishii, Yokohama (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 0 days.

(21) Appl. No.: 16/205,483

(22) Filed: Nov. 30, 2018

(65) Prior Publication Data

US 2019/0103922 A1  Apr. 4, 2019

Related U.S. Application Data

(63) Continuation of application No. PCT/JP2016/066837, filed on Jun. 7, 2016.

(51) Int. Cl.
*H04B 10/69* (2013.01)
*H04B 10/50* (2013.01)
(Continued)

(52) U.S. Cl.
CPC .......... *H04B 10/695* (2013.01); *H04B 10/40* (2013.01); *H04B 10/50* (2013.01); *H04B 10/60* (2013.01); *H04B 10/697* (2013.01)

(58) Field of Classification Search
None
See application file for complete search history.

(56) References Cited

U.S. PATENT DOCUMENTS

2003/0047757 A1* 3/2003 Kumazaki ............ G11C 7/1051
257/200
2004/0125902 A1  7/2004 Nishimura et al.
(Continued)

FOREIGN PATENT DOCUMENTS

JP   62-254556   11/1987
JP   2-228836    9/1990
(Continued)

OTHER PUBLICATIONS

Espacenet English abstract for Japanese Patent Publication No. 62-254556, published Nov. 6, 1987.
(Continued)

*Primary Examiner* — Darren E Wolf
(74) *Attorney, Agent, or Firm* — Staas & Halsey LLP

(57) ABSTRACT

An optical receiver includes photodetectors each provided on a corresponding channel of multiple channels and configured to detect an optical signal at the corresponding channel, a delay adjuster circuit provided before the photodetectors and configured to adjust a delay time of an optical waveform of an incoming signal on at least one channel, and a processor that controls the delay time such that a change point of a first optical waveform of a first channel is away from a data decision timing of a second optical waveform of a second channel, using information acquired from an electrical signal produced after photo-detection.

13 Claims, 12 Drawing Sheets

(51) Int. Cl.
  *H04B 10/40* (2013.01)
  *H04B 10/60* (2013.01)

(56) References Cited

U.S. PATENT DOCUMENTS

2007/0223919 A1* 9/2007 Kanesaka .............. H04B 10/66
                                                          398/27
2015/0069220 A1  3/2015 Yagisawa

FOREIGN PATENT DOCUMENTS

| JP | 5-48536 | 2/1993 |
| JP | 2015-56704 | 3/2015 |
| WO | WO 2012/150127 A1 | 11/2012 |

OTHER PUBLICATIONS

Espacenet English abstract for Japanese Patent Publication No. 2015-56704, published Mar. 23, 2015.
Espacenet English abstract for Japanese Patent Publication No. 2-228836, published Sep. 11, 1990.
Espacenet English abstract for Japanese Patent Publication No. 5-48536, published Feb. 26, 1993.
International Search Report dated Jul. 19, 2016 in corresponding International Patent Application No. PCT/JP2016/066837.
Written Opinion of the International Searching Authority dated Jul. 19, 2016 in corresponding International Patent Application No. PCT/JP2016/066837.

* cited by examiner

FIG.2
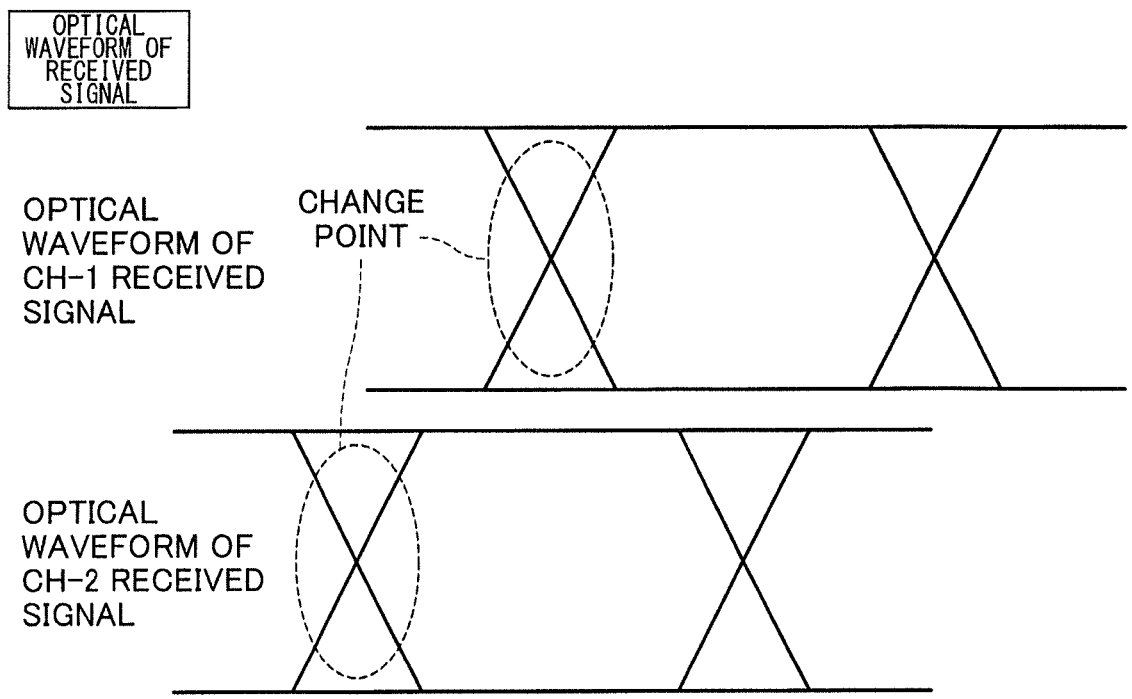
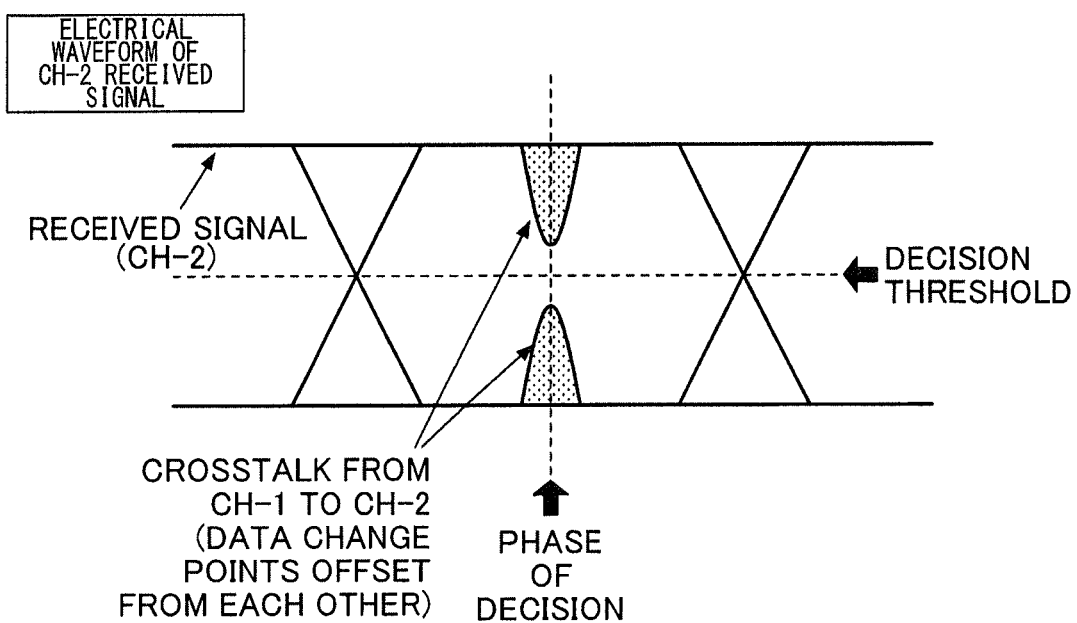

FIG.3
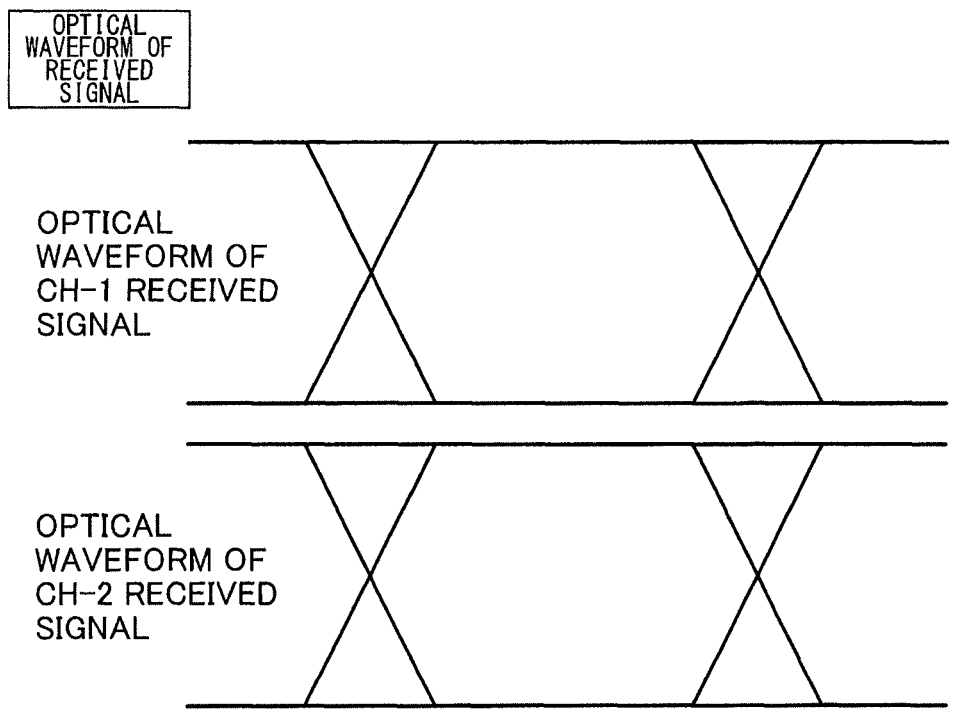
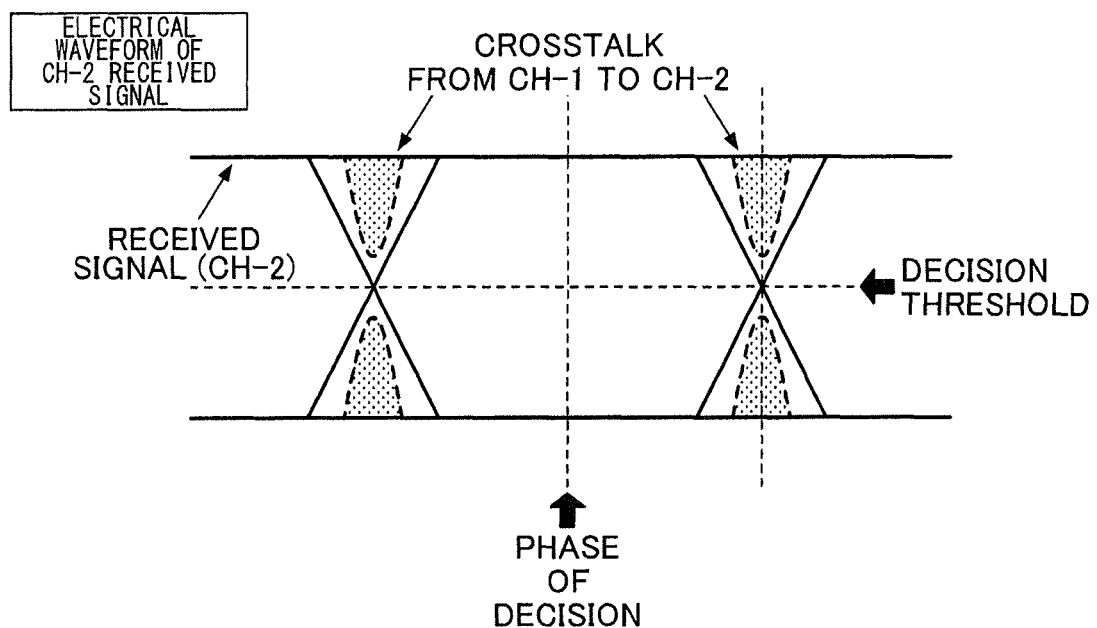

OPTICAL RECEIVER, OPTICAL TRANSCEIVER USING THE SAME, AND CONTROL METHOD OF RECEPTION OF OPTICAL SIGNALS

CROSS-REFERENCE TO RELATED APPLICATIONS

This application is a continuation of PCT International Application No. PCT/JP2016/066837 filed on Jun. 7, 2016 and designating the United States, the entire contents of which are incorporated herein by reference.

FIELD

The embodiments discussed herein relate to an optical receiver, an optical transceiver using the same, and a control method of reception of optical signals.

BACKGROUND

Today, to achieve high-capacity optical communications, development of multichannel optical transceivers is in progress. For example, a transmission scheme using four 25-Gpbs channels in combination with pulse amplitude modulation is adopted in optical transceivers designed for 100 gigabit Ethernet.

A receiver optical subassembly (ROSA) is provided in the receiver frontend of an optical transceiver for optical-to-electrical conversion and amplification. To reduce the ROSA size, a compact design for incorporating a plurality of channels into a package is being adopted.

In multimode transmission using discrete photodetectors, independently adjustable optical delay devices are arranged on single-mode fiber optic cables connected to the associated photodetectors. The optical delay devices are controlled by a digital signal processor (DSP) to bring all the incoming light signals in synchronization with one another. See, for example, Patent Document 1 listed below.

Another known technique is an electronic circuit for use in parallel transmission of electrical signals, adapted to correct for or retime a skew or a difference in propagation delay time between the clock and synchronized parallel data. See, for example, Patent Document 2 listed below.

RELATED-ART DOCUMENTS

Patent Documents

Patent Document 1: PCT International Publication No. WO 2012/150127
Patent Document 2: US Patent Application Publication No. 2004/0125902 A1

SUMMARY

According to an aspect of an embodiment, an optical receiver includes photodetectors each provided on a corresponding channel and configured to detect an optical signal at the corresponding channel, a delay adjuster circuit provided before the photodetectors and configured to adjust a delay time of an optical waveform of an incoming signal on at least one channel, and a processor that controls the delay time such that a change point of a first optical waveform of a first channel is away from a data decision timing of a second optical waveform of a second channel, using information acquired from an electrical signal produced after photo-detection.

It is to be understood that both the foregoing general description and the following detailed description are exemplary and explanatory and are not restrictive of the invention.

Additional objects and advantages of the embodiments will be set forth in part in the description which follows, and in part will be obvious from the description, or may be learned by practice of the invention.

BRIEF DESCRIPTION OF THE DRAWINGS

FIG. 2 illustrates influence of crosstalk between channels;
FIG. 3 illustrates a configuration that is not affected by crosstalk.

DESCRIPTION OF EMBODIMENTS

Figure 1:
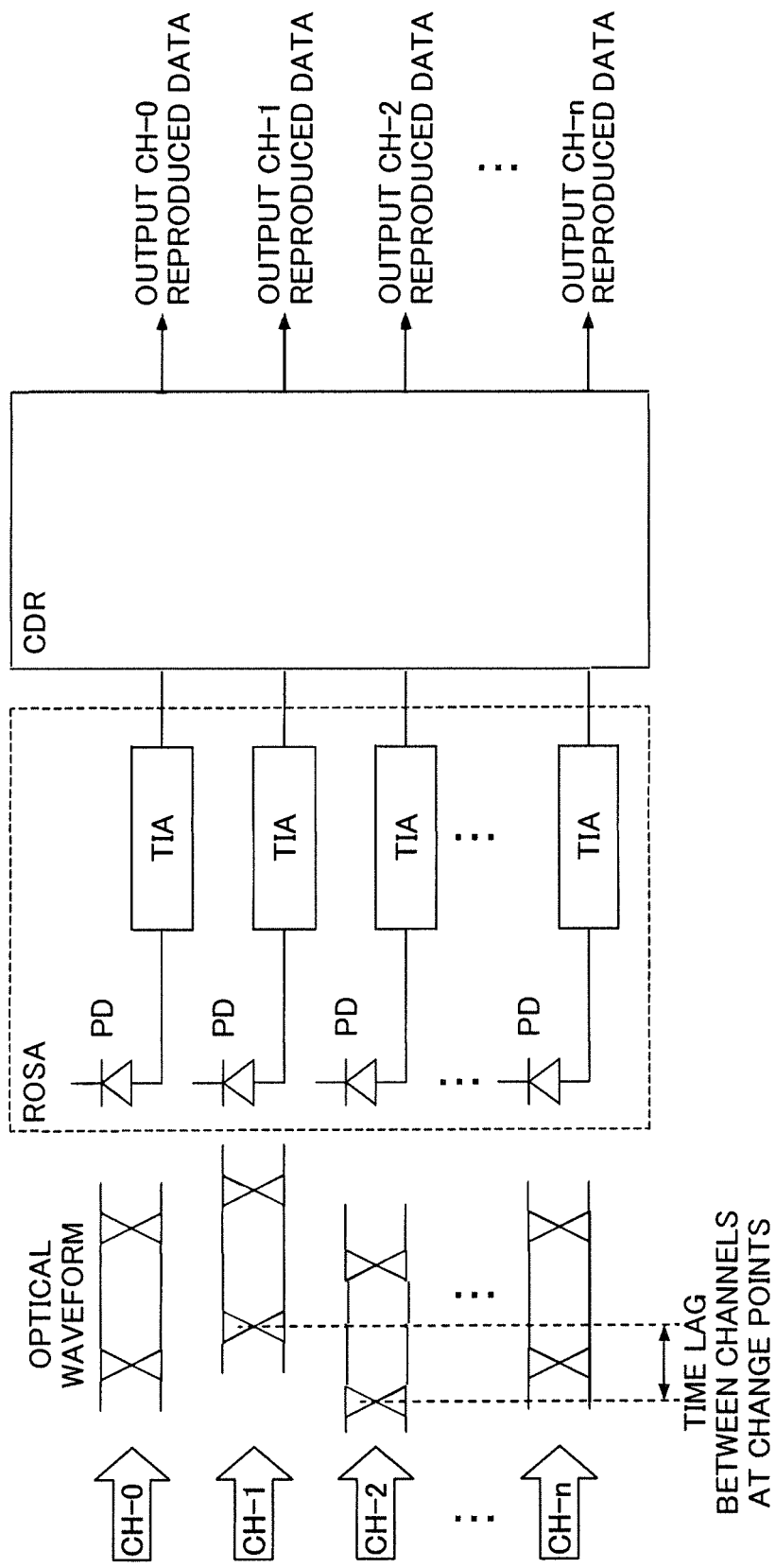
FIG. 1 illustrates influence of crosstalk between channels.

Prior to describing the details of configuration examples and processes of the embodiments, explanation is made with respect to influence of crosstalk arising in a compact ROSA package with reference to FIG. 1 and FIG. 2. In a ROSA package with multiple channels packed into a single unit, the receiver sensitivity is degraded due to crosstalk between channels. Unlike a conventional configuration in which light receiving sections are separated from one another between channels, inter-channel interference becomes conspicuous in a compactly integrated ROSA configuration. In particular, when optical signals are input to the ROSA with the data change points of the optical waveforms of incoming signals offset from one another, crosstalk occurs between channels due to voltage swing of the electrical signals produced after optical-to-electric conversion is performed.

For example, in optical transmission using n+1 channels (from Ch-0 to Ch-n) as illustrated in FIG. 1, the change points of the optical waveforms received at the ROSA may not be synchronized with each other depending on channels. Even if multichannel optical signals are transmitted from a transceiver in such a manner that the optical phases of the transmission signals are synchronized with one another, the change points of the optical waveforms are hardly maintained in synchronization with one another due to environmental influence of optical transmission such as variation in optical path lengths, phase fluctuation in optical waveforms of the transmitted signals, etc. Even if the physical lengths of the optical transmission paths are designed to be the same, the effective propagation length and/or the phase rotation may change depending on a certain factor such as the index of refraction. Moreover, the data change points of the optical waveforms of multichannel signals may already be out of synchronization between channels at the transmitter frontend. In such cases, a time lag is generated between change points of optical waveforms when input to a ROSA.

When the ROSA unit receives multichannel optical signals with data change points of the optical waveforms offset from one another, crosstalk will occur between transimpedance amplifiers (TIAs). Each of the incoming optical signals is detected as a photocurrent by the associated photodiode (PD), and the photocurrent is converted into a voltage signal by the associated TIA. At this point of time, the voltage swings with a predetermined amplitude at the rising edge and the falling edge of the transmitted data. The electromagnetic wave generated by the voltage swing cuts into or interferes to other channels inside the ROSA unit and eventually crosstalk occurs. Crosstalk is undesirable because the data decision accuracy of a clock and data recovery (CDR) circuit decreases and the receiver sensitivity is degraded.

FIG. 2 illustrates adverse influence of crosstalk occurring when the data change points of optical waveforms of incoming signals are out of synchronization. In the top half of FIG. 2, the data change point of the optical waveform of Channel-1 is offset from the data change point of the optical waveform of Channel-2. The bottom half of FIG. 2 illustrates influence on the electrical waveform of Channel-2 from Channel-1. The decision threshold used for data decision (i.e., determination of transmitted data bit values) is set to, for example, the middle of the voltage swing. The phase of decision which indicates a timing for data decision is set in or near the middle of two adjacent change points.

If a time difference in data change point is not negligible between channels as illustrated in the top of FIG. 2, voltage swing at the data change point of the optical waveform of Channel-1 will influence on the Channel-2 input signal. This interference causes the margin for data decision to narrow at the phase of decision as illustrated in the bottom of FIG. 2, and wrong decision may be made during data decision (determining bit "1" or bit "0"). The same adverse influence occurs from Channel-2 to Channel-1, and degrades the receiver sensitivity of Channel-1. Crosstalk may occur not only between Channel-1 and Channel-2, but also among all the channels incorporated in the ROSA package.

FIG. 3 illustrates a scenario where the data change points of optical waveforms of the incoming signals are time-aligned between Channel-1 and Channel-2. With an optical frontend circuit with photodiodes and TIAs integrated in a compact ROSA package, the change point of an electrical signal (i.e., voltage swing) of one channel may still influence on other channels. However, by controlling such that interference from a certain channel occurs at or near the change point of other channels, adverse effects on data decision can be avoided. This is the basic idea of the invention and illustrated at the bottom of FIG. 3, in which interference from Channel-1 occurs at the change point of the electrical waveform of the Channel-2 received signal. In this case, the crosstalk rarely influences on the threshold decision at the phase of decision.

Techniques disclosed in the embodiments reduce inter-channel crosstalk by realizing the configuration of FIG. 3. Namely, the data change points of the optical waveforms are time-aligned at the input end to a ROSA, using information acquired from a block subsequent to photo detection (e.g., by photodiodes).

Figure 4:
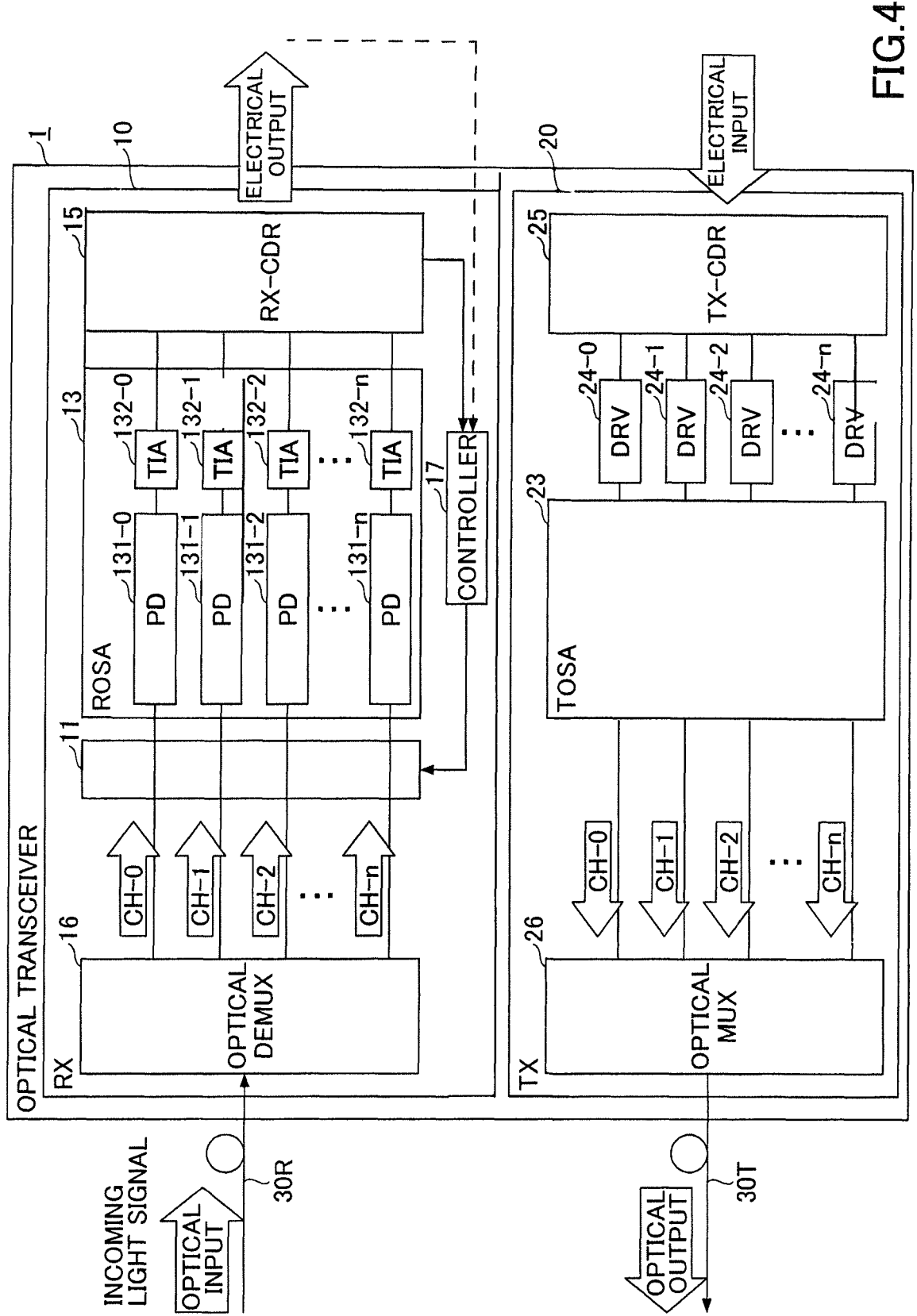
FIG. 4 is a schematic diagram of an optical transceiver with a monitor signal fed back from a block positioned after the ROSA.

FIG. 4 is a schematic diagram of an optical transceiver 1 according to an embodiment. The optical transceiver 1 includes an optical receiver 10 and an optical transmitter 20. At the receiving end, optical signals are received at the optical receiver 10 from the optical transmission path 30R, and electrical signals are output from the optical receiver 10. At the transmission end, electrical signals are input to the optical transmitter 20 and optical signals are output to the optical transmission path 30T.

In the optical transmitter 20, the input electrical signal is subjected to waveform shaping and retiming processes at CDR 25, and then converted into high-speed drive signals at drivers 24-0 through 24-n provided on the respective channels. The high-speed drive signals are supplied to a transmitter optical subassembly (TOSA) 23. TOSA is an integrated frontend module on the transmitter side. Since the configuration and the operations of the TOSA unit are not directly related to the present invention, detailed explanation for it is omitted here. Briefly, optical modulators and a laser diode serving as a light source are incorporated in the TOSA unit, and the optical modulators are driven by the drive signals at the respective channels. The optical modulators may be electro-absorption modulators (semiconductor devices) or lithium niobate (LN) modulators. The optical signals generated on the respective channels are multiplexed at the optical multiplexer 25, and output to the optical transmission path 30T.

In the optical receiver 10, multichannel optical signals received from the optical transmission path 30R are demultiplexed at the optical demultiplexer 16 into optical signals of the individual channels. The multichannel optical signal may be a wavelength division multiplexed (WDM) signal, a space division multiplexed signal, or a mode division multiplexed signal.

On the input side of the ROSA 13 is provided a delay adjuster circuit 11 configured to adjust the delay time of the optical signal input to the ROSA 13 on each channel. Delay time on each channel can be adjusted by, for example, minimizing the group delay. In the delay adjuster circuit 11, the delay time of the optical signal propagating through the individual channel is variable such that the data change points of the waveforms of the incoming signals are time-aligned with one another between channels. Control operations for the time-alignment of the data change points are performed using information from electrical signals obtained after the photo-detection of the optical signals at the photodiodes 131-0 to 131-n, which will be described in more detail below.

The delay adjusted optical signals of the respective channels are supplied from the delay adjuster circuit 11 to the ROSA 13, and converted into photocurrents by the photodiodes 131-0 to 131-n. The photocurrents are then converted into electric voltages by TIA 132-0 to 132-n. The voltage signals output from the ROSA 13 are supplied to CDR 15. A set of linear amplifiers may be provided inside the ROSA 13, or between the ROSA 13 and the CDR 15, to amplify the voltage levels of the output signals of the TIA 132-0 to 132-n to an appropriate level.

The CDR 15 extracts or generates a clock from each of the channels, restores the data signal using the clock, and outputs an analog electrical signal. The analog electrical signals of the respective channels are converted into digital signals, and subjected to the subsequent processes including channel estimation, chromatic dispersion compensation, polarization processing, error correction, etc. in a digital signal processor (DSP). Thus, the transmitted data signals are demodulated and decoded.

Information indicated by the electrical signals obtained after the photo-detection at the photodiodes 131-0 to 131-n is supplied via the controller 17 to the delay adjuster circuit 11, as indicated by the dashed line in FIG. 4. Delay time on each channel is adjusted by the delay adjuster circuit 11 under the control of the controller 17. The information represented by the electrical signal includes, but is not limited to, clocks extracted at the CDR15, signal receive quality information such as a bit error rate, and so on. The electric voltages output, from the TIAs on the respective channels may also be used.

Detailed explanation is now made to particular configurations and techniques for group delay control.

<First Embodiment>

Figure 5:
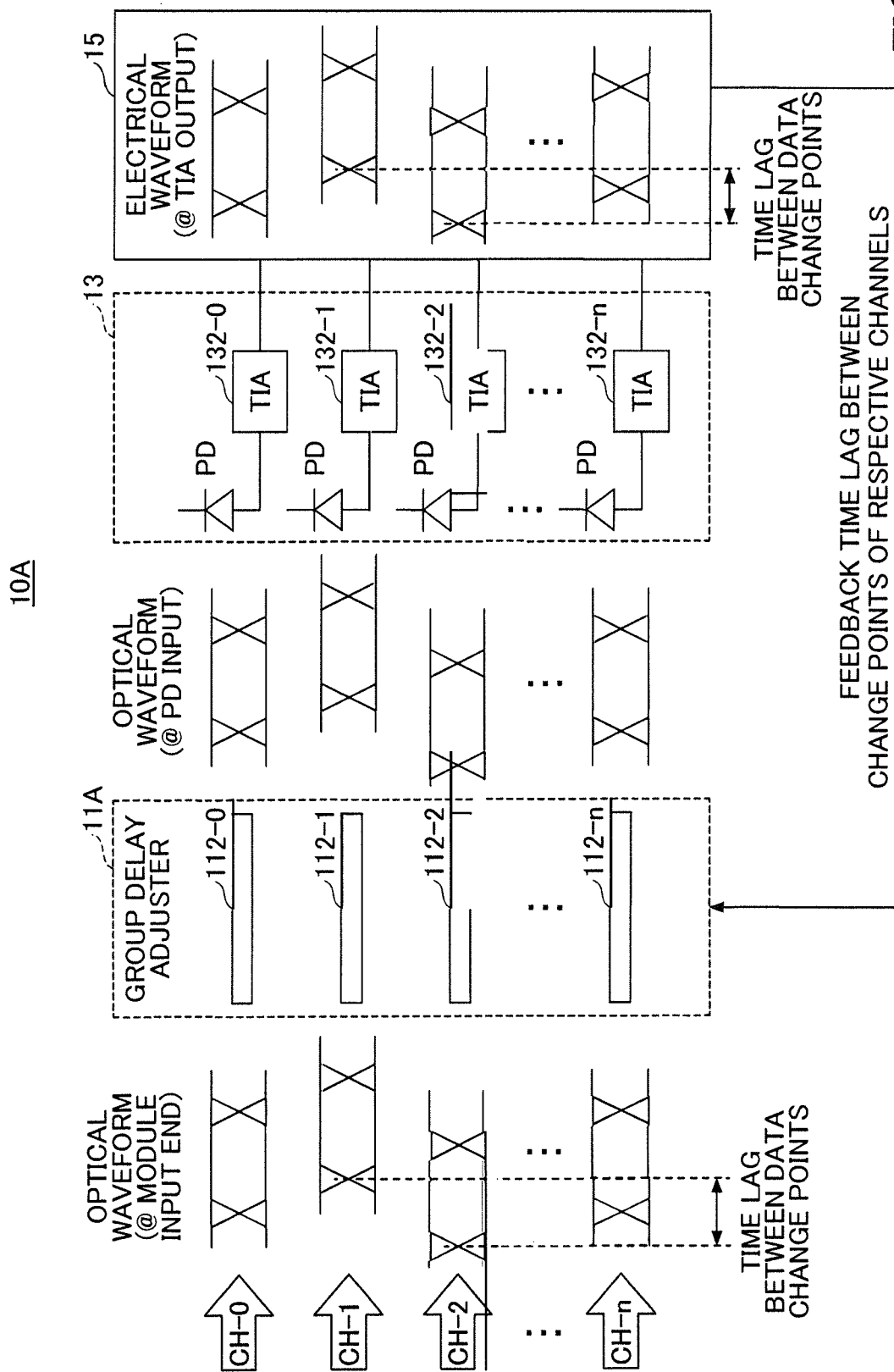
FIG. 5 illustrates a feedback control architecture according to the first embodiment.
Figure 6:
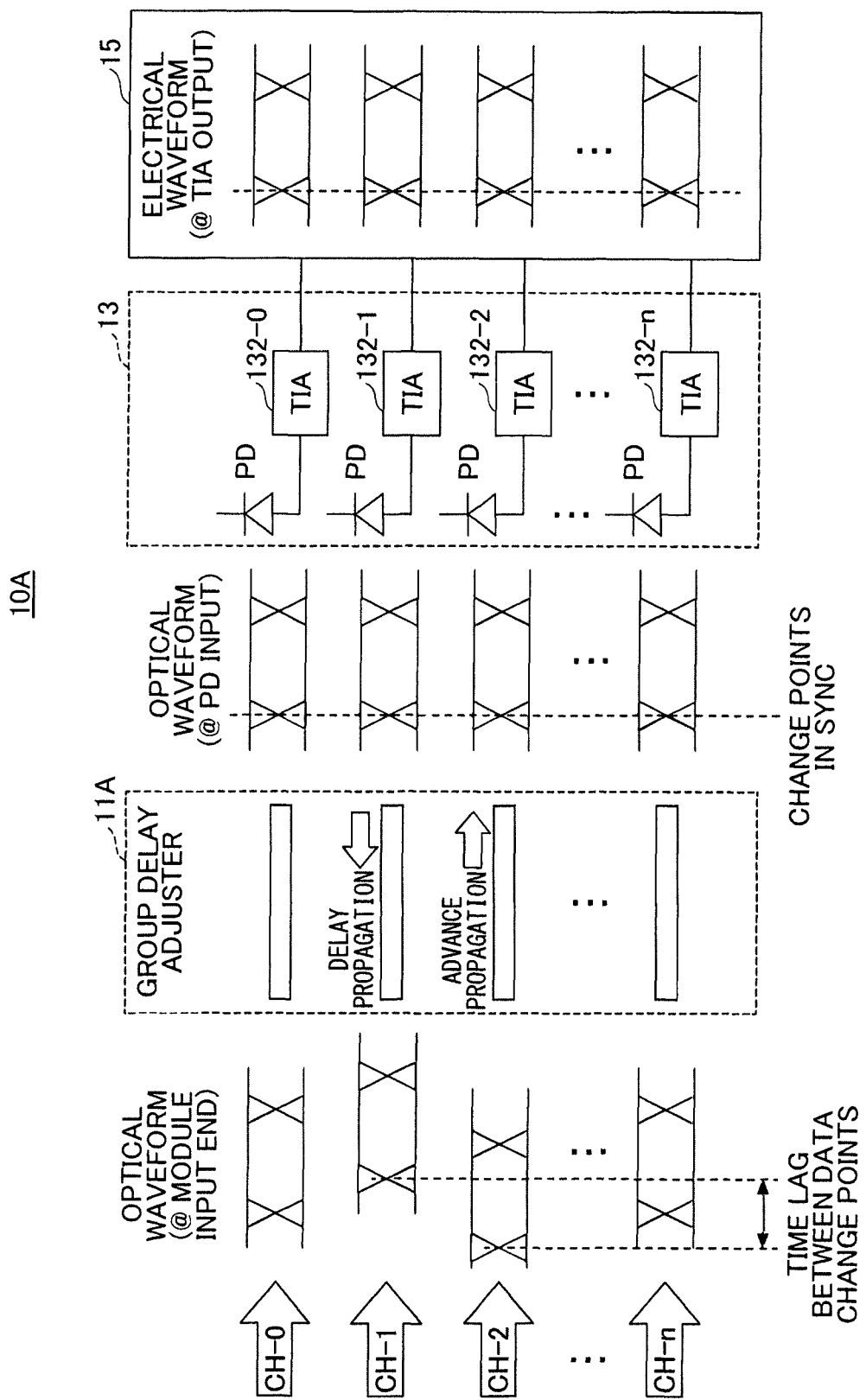
FIG. 6 illustrates a feedback control architecture according to the first embodiment.

FIG. 5 and FIG. 6 illustrate examples of group delay control performed in the optical receiver 10A of the first embodiment. In FIG. 5, after channel separation and before photo-detection at the photodiode 131-0 to 131-n, a group delay adjuster 11A (which is an example of the delay adjuster circuit 11) is provided to adjust the delay time on the respective channels. The group delay adjuster 11A includes group delay variable elements 112-0 to 112-n provided for the respective channels.

Group delay is a parameter representing the delay time of a propagating optical waveform. Group delay is different from phase delay. Phase delay represents the absolute value of a delay time calculated by dividing a phase difference ($\varphi$) between input and output waveforms by angular frequency ($\omega$). In contrast, group delay is a derivative of a phase difference with respect to angular frequency and it represents a rate of change of the optical phase with respect to frequency. By minimizing the group delay (i.e., rate of phase shifting), the delay time can be maintained constant.

The group delay variable elements 112-0 to 112-n are made of, for example, silicon (Si), a polymer, an electro-optic material, a photonic crystal, etc. With silicon or polymer, the index of refraction can be changed by temperature control. With electro-optic materials or photonic crystals, the index of refraction can be changed by controlling a voltage to be applied thereto. As the index of refraction changes, the propagation speed of light wave travelling through the medium varies, and accordingly, group delay or delay time can be adjusted.

As illustrated in FIG. 5, if a time difference exists between channels at the data change point of the optical waveform, then crosstalk occurs among TIA 132-0 to 132-n. The waveforms of the electrical signals to be input to the CDR 15 are distorted, and clock extraction and data decision at the CDR 15 become difficult. Although FIG. 5 illustrates a time difference at the data change points between channel-1 and channel-2 for the sake of convenience of illustration, such time differences at data change points may occur across the channels.

The electrical waveforms output from the TIA 132-0 to 132-n directly reflect the time differences at the change points of the associated optical waveforms input to the ROSA 13. Accordingly, in the first embodiment, the change point of the incoming optical signal on each of the multiple channels is detected based upon the electrical signal waveform output from associated one of the TIA 132-0 to 132-n. The detection result is fed back to the group delay adjuster 11A to minimize the time difference at the data change points among the multiple channels.

FIG. 6 illustrates an example of group delay control configuration. For example, channel-1 is controlled so as to decrease the propagation speed of the optical signal travelling on that channel, while channel-2 is controlled so as to increase the propagation speed of the optical signal travelling on that channel. Under this control, the change points of the optical waveforms output from the group delay adjuster 11A are substantially time-aligned with each other. The time-aligned optical signals on the respective channels are input to the ROSA 13 with little or minimized time offset among the change points of the optical waveforms. Accordingly, influence of crosstalk among the TIA 132-0 to 132-n is reduced, and electrical signals with appropriate waveforms are supplied to the CDR 15.

Figure 7:
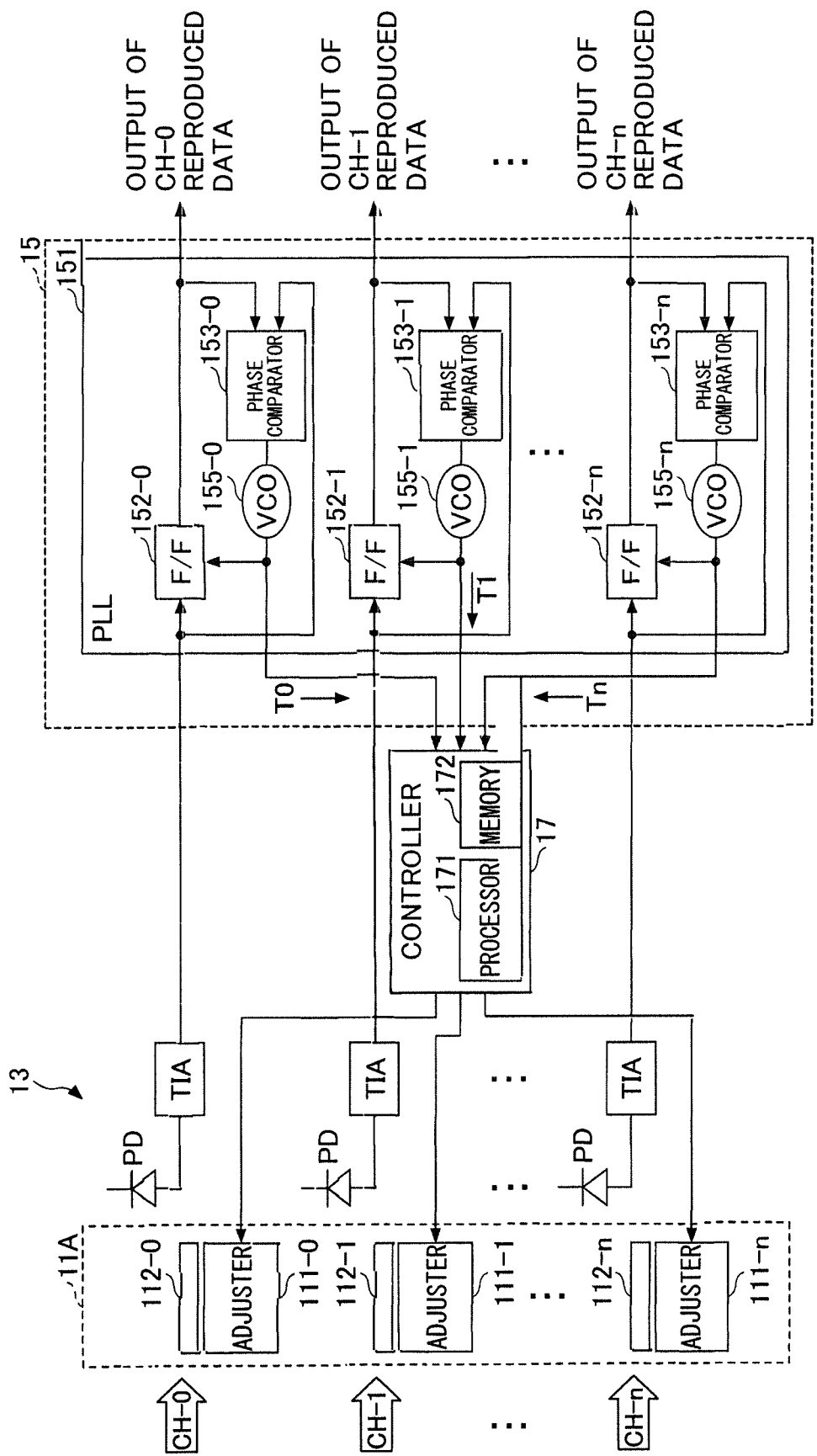
FIG. 7 illustrates a configuration example of the feedback control according to the first embodiment.

FIG. 7 also illustrates an example of the group delay control configuration according to the first embodiment. The group delay adjuster 11A has the group delay variable elements 112-0 to 112-n provided on the respective channels, and propagation speed adjusters 311-0 to 111-n are provided to adjust the propagation speed of the light travelling through the associated group delay variable elements 112-0 to 112-n. When the group delay variable elements 112-0 to 112-a are made of, for example, silicon, the index of refraction of each of the group delay variable elements 112-0 to 112-n is adjusted using a temperature controller such as a heater.

The CDR 15 is adapted to synchronize the phases of the input signal and the output signal using, for example, a phase locked loop (PLL) circuit 151. The PLL circuit 151 has multiple circuit blocks corresponding to the multiple channels. The number of the PLL circuit blocks is the same as that of the multiple channels. The PLL circuit block for channel-0 has a flip-flop (F/F) circuit 152-0, a phase comparator 153-0, and a voltage-controlled oscillator (VCO) 155-0.

The electrical signal output from the TIA 132-0 of channel-0 is connected to the input of the flip-flop circuit 152-0. A portion of the input signal to the flip-flop circuit 152-0 is branched and connected to one input of the phase comparator 153-0. The flip-flop circuit 152-0 detects the edge of the input signal at the oscillation frequency of the VCO 155-0, and outputs the retimed data signal. A portion of the retimed data signal is branched and connected to the other input of the phase comparator 153-0.

The phase comparator 153-0 compares the phase of the signal input to the PLL 151 and the phase of the retimed data signal, and outputs a voltage representing the phase difference. The phase comparator 153-0 can be realized by any appropriate configurations, for example, an XOR circuit or a flip-flop type phase frequency comparator may be used. The output of the phase comparator 153-0 is connected to the input of the VCO 155-0.

The VCO 155-0 generates a clock with a frequency and a phase according to the phase difference (or the voltage from the phase comparator). The clock output from the VCO 155-0 is fed back to the flip-flop circuit 152-0 and used for edge detection of the input signal. Thus, by inputting the difference between the feedback signal from the VCO 155-0 and the change point (or the edge) of the electrical input signal to the VCO 155-0, the phases of the input signal and the output signal are synchronized with each other. The clock generated by the VCO 155-0 represents the change point of the electrical waveform of the input signal. This clock is supplied as a timing signal T0 of the channel-0 to the controller 17.

The circuit block corresponding to channel-1 has a flip-flop circuit 152-1, a phase comparator 153-1 and a VCO 155-1, and operates in the same manner as the circuit block for the channel-0. The clock generated by the VCO 155-1 is supplied as a channel-1 timing signal T1 to the controller 17.

Similarly, the circuit block corresponding to channel-n has a flip-flop circuit 362-n, a phase comparator 153-n and a VCO 155-n, and the same operations as the circuit blocks of channel-0 and channel-1 are performed. The Clock generated by the VCO 155-n is supplied as a channel-n timing signal Tn to the controller 17.

The controller 17 includes a processor 171 and a memory 172. The timing signals T0 to Tn of the respective channels supplied from the PLL circuit 151 are stored in the memory 172. The processor 171 generates control signals to be supplied to the propagation speed adjusters 111-0 to 111-n of the group delay adjuster 11A, using the timing information stored in the memory 172.

The propagation speed adjusters 111-0 to 111-n perform temperature control or voltage control according to the control signals supplied from the controller 17 to control the indexes of refraction of the associated group delay variable elements 112-0 to 112-n, thereby adjusting the propagation speeds of the optical signals on the respective channels. This arrangement can minimize the phase or time difference of the change points of the optical waveforms between channels.

Figure 8:
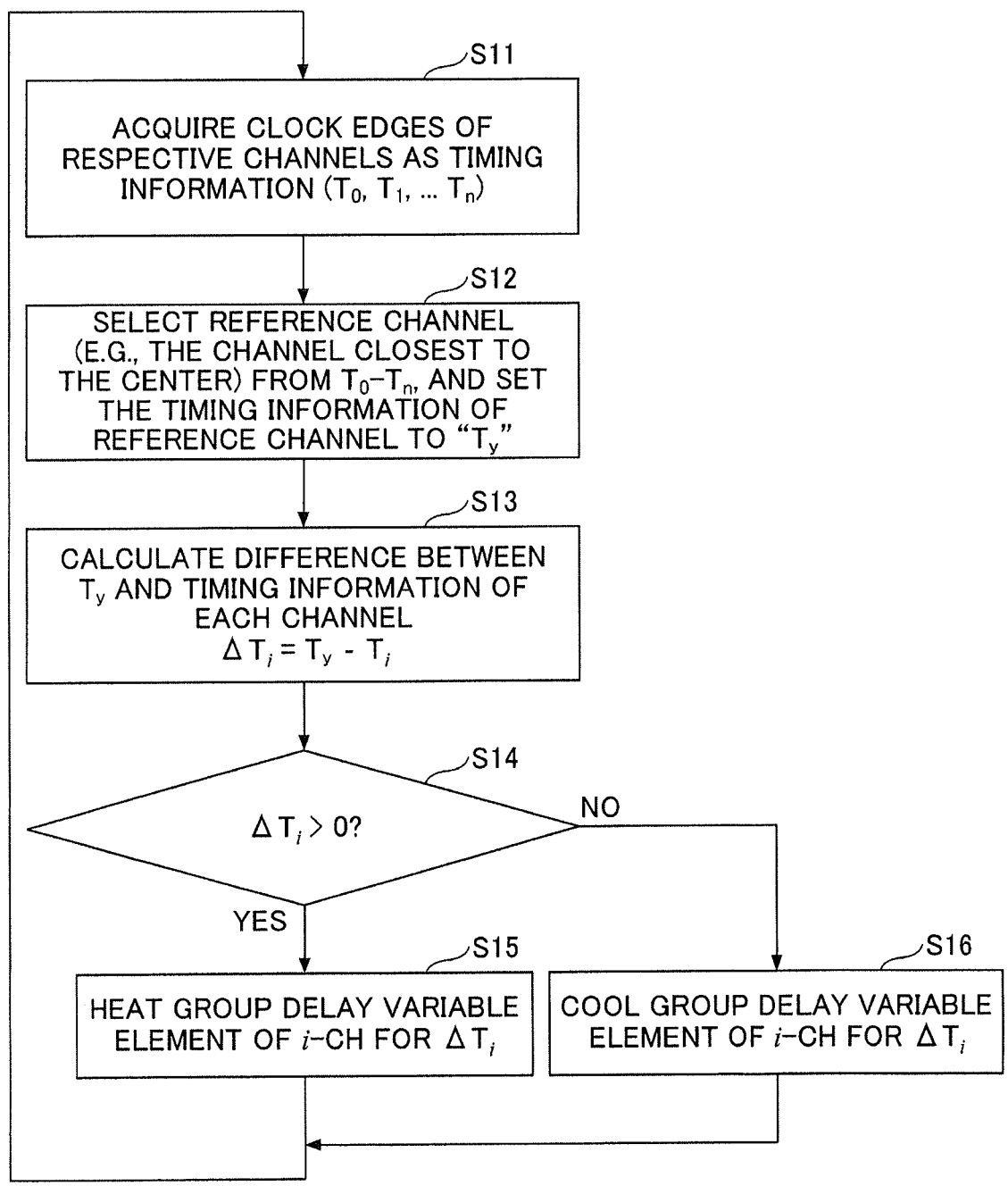
FIG. 8 is a flowchart of signal reception control operations according to the first embodiment.

FIG. 8 is a flowchart illustrating control operations of the controller 17. The controller 17 acquires the timing signals T0 to Tn representing the clock edges of the respective channels (S11). A reference channel is selected from among the timing signals T0 to Tn (S12). The timing information of the reference channel is set as "Ty". For example, timing information of the channel closest to the center of the channels may be set to "Ty". Then, a difference $\Delta Ti$ between the timing information "Ty" of the reference channel and the timing information of each of the other channels is calculated (S13). The difference $\Delta Ti$ in the timing information is expressed by $\Delta Ti = Ty - Ti$ (where "i" is an integer from 0 to n except, for the reference channel number), and it indicates the time difference at data change point between the reference channel and any of the other channels.

Then, it is determined whether the difference $\Delta Ti$ of each channel is greater than zero ($\Delta Ti > 0$) in S14. If $\Delta Ti$ is greater than zero (Yes in S14), the timing of the target channel is delayed behind the reference channel, and accordingly, the propagation speed of the optical signal on that channel is increased to minimize $\Delta Ti$ (S15). The propagation speed of the target channel may be increased by decreasing the index of refraction of the associated group delay variable element 112-i. In the example of the control flow of FIG. 6, the associated group delay variable element 112-i is heated for $\Delta T$ minutes to reduce the index of refraction. If the $\Delta Ti$ is not greater than zero (No in S14), it is determined that the timing of the target channel is faster than the reference channel, and the index of refraction of the group delay variable element 112-i of the target channel is increased so as to minimize the $\Delta Ti$ (S16). In the example of the control flow of FIG. 6, the associated group delay variable element 112-i is cooled for $\Delta T$ minutes to increase the index of refraction, when the absolute value of the difference $\Delta ti$ is smaller than a predetermined threshold value, it may be determined that the time amount of the group delay is substantially the same or very close to each other in S14. In this case, the control on the index of refraction of the target channel may be skipped.

When step S15 or S16 is finished, the process returns to step S11 and repeats the flow at the next timing. Namely, timing signals T0 to Tn obtained from the CDR 15 at the next timing are read out of the memory 172, and steps S11 to S16 are repeated. The operation flow of FIG. 8 is repeated during the service of the optical transceiver 1 to maintain the amount of group delay constant among the multiple channels. Consequently, the change points of the optical waveforms of the incoming signals (and the change points of the electrical waveforms of the input signals to the CDR 15) are time-aligned among the channels, and crosstalk can be reduced in the CDR 15.

Although in the example of FIG. 8 the channel closest to the center of the multiple channels is selected as the reference channel, the invention is not limited to this example. For example, the channel with the most advanced timing or the channel with the slowest tinting may be selected as the reference channel.

<Second Embodiment>

Figure 9:
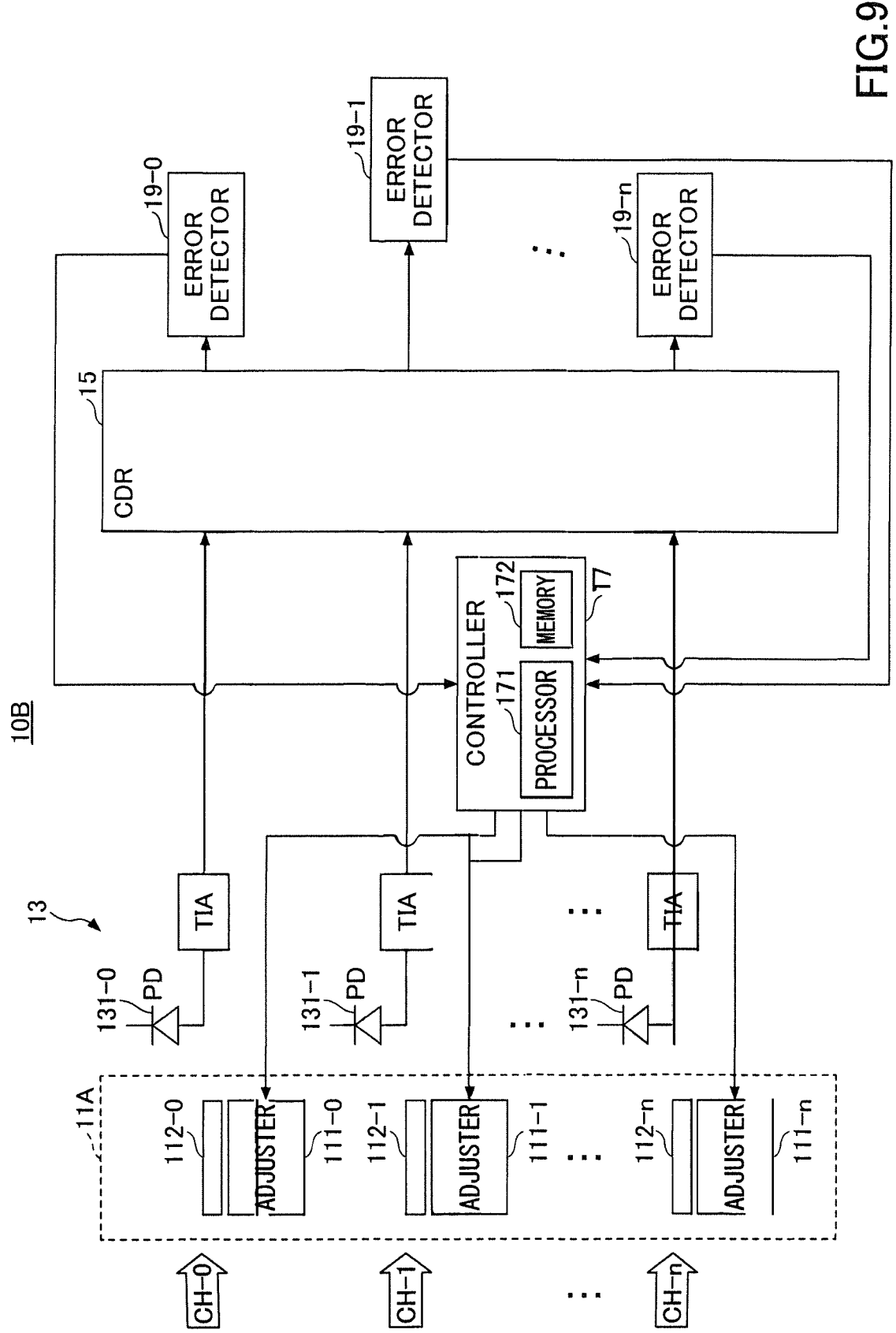
FIG. 9 illustrates a configuration example of feedback control according to the second embodiment.

FIG. 9 illustrates an example of a group delay control configuration in an optical receiver 10 of the second embodiment. In the second embodiment, bit error information acquired from an error detector is used for group delay control, and group delays of the optical waveforms are controlled among multiple channels so as to minimize the bit error rate of each channel.

As in the first embodiment, after channel separation and before photo-detection by the photodiodes 131-0 to 131-n, a group delay adjuster 11A is provided on the respective channels. The group delay adjuster 11A includes group delay variable elements 112-0 to 112-n provided for the respective channels and propagation speed adjusters 111-0 to 111-n for adjusting the propagation speeds of the optical signals travelling through the group delay variable elements 112-0 to 112-n.

The optical signals on the respective channels are detected by the photodiodes 131-1 to 131-n. The photocurrents are converted and amplified to electric voltages by the associated TIAs. The electrical signals are subjected to waveform shaping and retiming at the CDR 15. The CDR 15 has any suitable circuit configuration for performing extraction of clock signals and data decision, and it may use, for example, a PLL circuit block provided for each of the channels.

The outputs of the CDR15 are converted into digital signals, subjected to, for example, channel estimation, wavelength dispersion compensation, polarization processing, etc., and then supplied to bit error detectors 19-0 to 19-n.

The bit error detectors 19-0 to 19-n detect bit error rates in the optical signals received from the associated channels, and supply the detection results to the controller 17. The bit error rate may be an indicator indicating signal to noise (S/N) ratio. The greater the crosstalk between channels, the greater the bit error rate is. The controller 17 controls the propagation speed adjuster 111-0 to 111-n (such as heaters) for adjusting the propagation speeds of optical signals travelling through the associated group delay variable elements 112-0 to 112-n so as to minimize the bit error rates on the respective channels. The particulars of the control operations of the controller 17 are described below.

Figure 10:
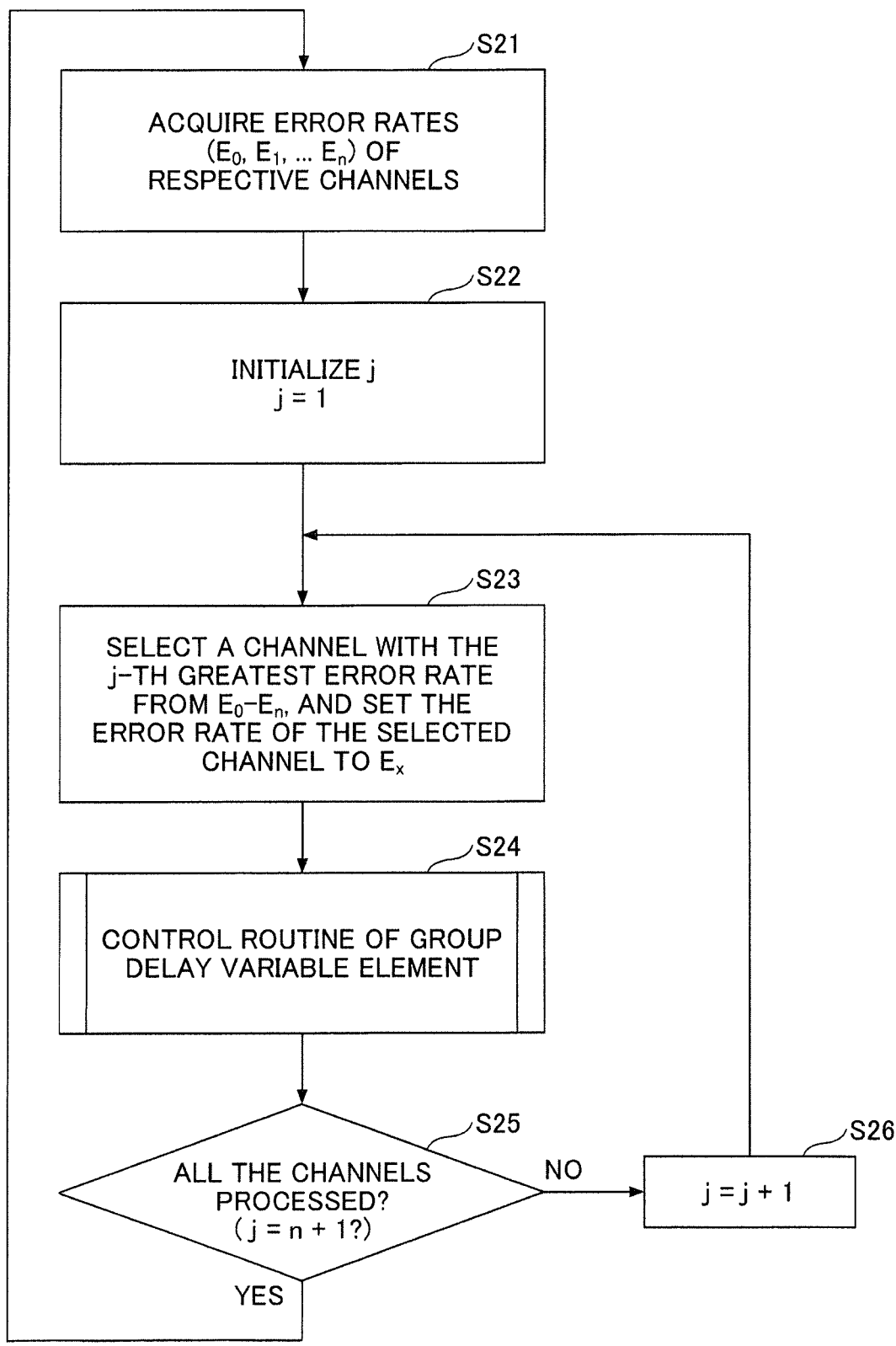
FIG. 10 is a flowchart of signal reception control operations according to the second embodiment.

FIG. 10 is a flowchart illustrating the operations performed by the controller 17. First, the bit error rates E0 to En of the respective channels detected by the bit error detectors 19-0 to 19-n are collected (S21). The value "j" which represents the sequential order of the bit error rate from the greatest to the smallest is initialized (j=1), where "j" is an integer from 1 to n+1 (S22). After initialization of the value j, the channel with the greatest bit error rate is selected for the first round, then the channel with the j-th greatest bit error rate is selected from E0 to En, and the bit error rate of the selected channel is set to Ex (S23). A control routine of group delay adjustment is performed on the group delay variable element 112-x of the selected channel (S24). when the control routine for the selected channel is finished, it is determined whether the group delay adjustment has been made for all the channels, i.e., whether the value "j" has reached j=n+1 (S25). If there are any channels left unprocessed (No in S25), the value "j" is incremented to j=j+1 (S26), and the process returns to step S23. In S23, the next channel with the second largest (for the second round) or the (j+1)-th largest (for the (j+1)-th round) is selected and the bit error rate of the selected channel is set to Ex. Then, the control routine of the group delay adjustment is performed on that channel (S24). Steps S23 to S25 are repeated until all the channels have been processed. When the group delay adjustment is completed for all the channels (Yes in S25), the process returns to S21 and steps S21 to S26 are performed for the subsequently collected data set.

This control process is performed repeatedly during the service of the optical transceiver 1 to maintain the quantities of the group delays constant among the multiple channels. With this arrangement, the change points of the electrical waveforms to be input to the CDR 15 are time-aligned between channels and crosstalk can be reduced.

Figure 11:
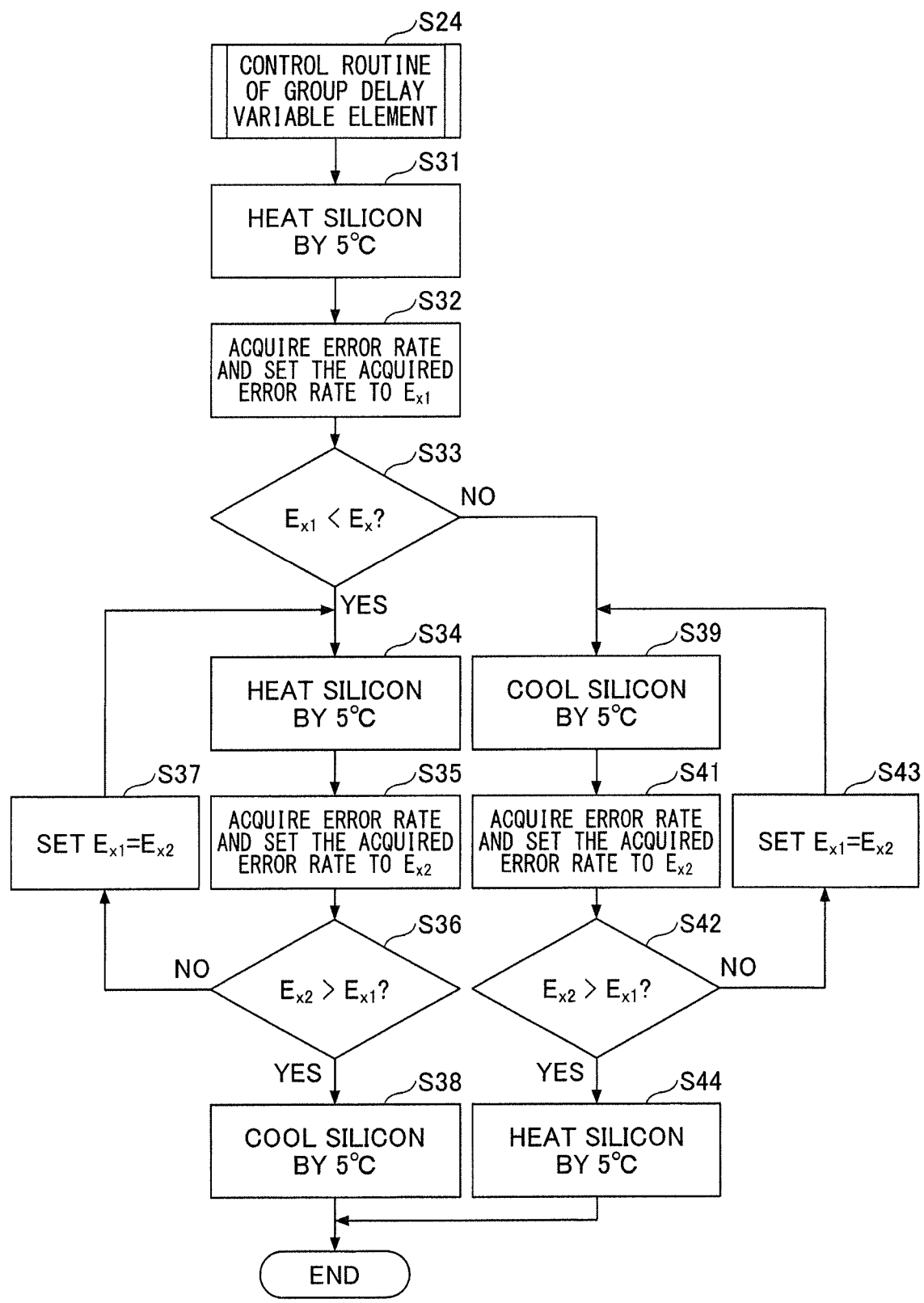
FIG. 11 is a flowchart of the control routine of a group delay variable element in step S24 of FIG. 10.

FIG. 11 is a flowchart illustrating a particular example of the control routine (S24) of FIG. 10 performed on the group delay variable elements. In FIG. 11, it is assumed that the group delay variable elements 112-0 to 112-n are made of, for example, silicon. First, silicon is heated with a certain step size until the silicon temperature rises by predetermined degrees (S31). The step size of the heating nay be set to an appropriate value, and in this particular example of FIG. 11, it is set to 5° C.

After the heating, the bit error rate of the focused-on channel is acquired from the associated bit error detector 19-x and the acquired bit error rate is set to Ex1 (S32). Then, it is determined whether the bit error rate Ex1 after the heating becomes smaller than the bit error rate Ex before the heating (Ex1<Ex) (S33). If the bit error rate Ex1 is reduced by the heating (Yes in S33), it means that the direction of control is correct. In this case, the group delay variable element of silicon is further heated to raise the temperature by 5° C. (S34), and bit error rate Ex2 after the heating is acquired from the same bit error detector 19-x (S35). It is again determined whether the newly acquired bit error rate Ex2 has exceeded the previous bit error rate Ex1 (Ex2>Ex1) (S35). If the new bit error rate Ex2 is equal to or less than the previous error rate Ex1 (No in S36), the direction of control is still correct. In this case, the bit error rate of this channel is updated from Ex1 to Ex2 (Ex1=Ex2) (S37), and the steps S34 to S36 are repeated. If the newly acquired bit error rate Ex2 becomes greater than the previous error rate Ex1 (Yes in S36), the silicon is overheated. Accordingly, the group delay variable element is cooled by 5° C. and the control routine for this channel is finished. Then the process returns to step S25 of FIG. 10.

If in step S33 Ex1 does not become smaller than Ex (No in S33), it means that the direction of control is incorrect, and the process jumps to step S39 and the control is performed in the reverse direction. Namely, the group delay variable element of silicon is cooled by 5° C. (S39), and the bit error rate Ex2 after the cooling is acquired from the bit error detector 19-x (S41). It is then determined whether the newly acquired bit error rate Ex2 has become greater than the previous bit error rate Ex1 (Ex2>Ex1) (S42). If the new bit error rate Ex2 is equal to or leas than the previous error rate Ex1 (No in S42), the direction of control is correct. In this case, the acquired bit error rate is updated from Ex1 to Ex2 (Ex1=Ex2) (S43), and then steps S39 to S42 are repeated. If the new bit error rate Ex2 has become greater than the previous bit error rate Ex1 (Yes in S42), the silicon is overcooled. Accordingly, the group delay variable element is heated by 5° C. (S44), and the control routine for this channel is finished. Then, the process returns to step S25 of FIG. 10.

With this method, the bit error rate becomes the minimum on each channel and the S/N ratio is improved. This means that crosstalk between channels is reduced. The same control operations apply to the group delay variable elements 112-0 to 112-n made of an electro-optic material or a photonic crystal. The voltage level applied to the electro-optic or photonic crystal is changed with a predetermined step size so as to minimize the bit error rate of each of the multiple channels, and the influence of inter-channel crosstalk can be reduced.

The sequential order of the process for minimizing the bit error rate is not limited to the descending order of the bit error rate from the greatest to the smallest. The process may be performed in the numerical order of the channel index.

Figure 12:
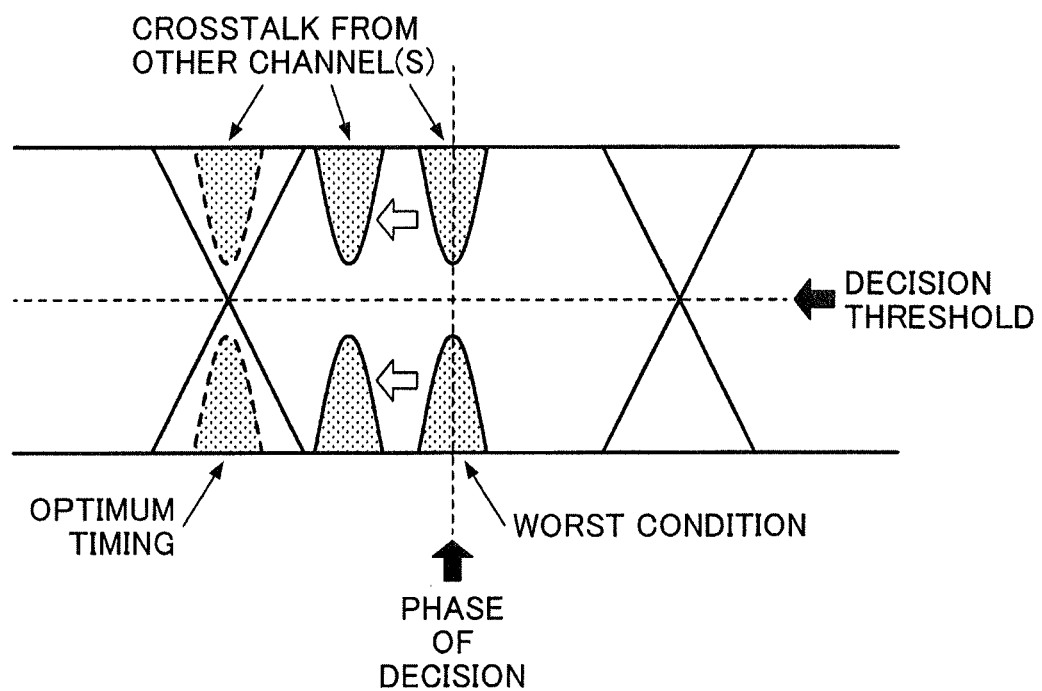
FIG. 12 illustrates an advantageous effect of group delay control on optical waveforms.

FIG. 12 illustrates one of the advantageous effects of the embodiments. In the first and second embodiments described above, crosstalk is reduced by bringing the data change points of the optical waveforms of the incoming signals to be in time-alignment between all the channels. Besides, degradation in receiver sensitivity is also avoided if a sufficient amount of margin is assured for threshold decision at the phase of decision.

The worst condition that causes degradation in receiver sensitivity is the case in which the optical waveform of one channel changes greatly at the timing (or the phase) of data decision. In this worst case, the error race in data decision (e.g., bit "0" or bit "1") is likely to increase due to the decreased margin for the decision threshold. In contrast, at the optimum timing, the data change points of the optical waveforms are time-aligned among channels. Even if it is difficult to correct the data change point of the optical waveform into the optimum timing (or phase) depending on limitation of materials or other reasons, the accuracy of data decision can be maintained as long as the worse condition of receiver sensitivity degradation is avoided. Thus, by controlling the group delay in the direction where the change point of the received optical waveform of one channel is away from the data decision timing of the other channels, the influence of crosstalk can be reduced.

The embodiments described above are exemplary and many other modifications and alterations are included in the invention. For example, the receiver-side CDR 15 and the transmitter-side CDR 25 may be integrated on a single chip in the optical transceiver 1. A CPU commonly used in the optical transceiver 10 and the optical transmitter 20 may be used as the controller 17. Multi-channel transmission may be implemented by space division (or mode division) multiplexing, in place of the wavelength division multiplexing. As a photodetector, any typo of photodiode such as a PN photodiode, PIN photodiode, avalanche photodiode, etc., capable of outputting photocurrent in proportion to the incident light may be used.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. An optical receiver comprising:
    photodetectors each provided on a corresponding channel of multiple channels and configured to detect an optical signal at the corresponding channel,
    a delay adjuster circuit provided before the photodetectors and configured to adjust a delay time of an optical waveform of an incoming signal on at least one channel, and
    a processor that controls the delay time such that a change point of a first optical waveform of a first channel is away from a data decision timing of a second optical waveform of a second channel, using information acquired from an electrical signal produced after photodetection,
    wherein the processor receives a bit error rate of each of the multiple channels and controls the delay time in the delay adjuster circuit so as to minimize the bit error rate of said each of the multiple channels.

2. The optical receiver as claimed in claim 1, wherein the processor controls the delay time so as to bring the change point of the first optical waveform of the first channel to be in time-alignment with a change point of the second optical waveform of the second channel.

3. The optical receiver as claimed in claim 1, wherein the delay adjuster circuit has, on each of the multiple channels, a group delay variable element made of silicon, a polymer, an electro-optic material, or a photonic crystal, and a propagation speed adjuster that changes an index of refraction of the group delay variable element to adjust a propagation speed of the optical signal passing through the group delay variable element.

4. The optical receiver as claimed in claim 1, further comprising:
    a clock data recovery circuit provided behind a block of the photodetectors and configured to generate timing signals for data decision on the multiple channels,
    wherein the processor controls the delay time in the delay adjustor circuit according to the timing signal.

5. The optical receiver as claimed in claim 4, wherein the processor selects a reference channel according to the timing signals and controls the delay time in the delay adjuster circuit so as to minimize a time difference between the data decision timing of the reference channel and the data decision timing of the other channels.

6. An optical receiver comprising:
    photodetectors each provided on a corresponding channel of multiple channels and configured to detect an optical signal at the corresponding channel,
    a delay adjuster circuit provided before the photodetectors and configured to adjust a delay time of an optical waveform of an incoming signal on at least one channel, and
    a processor that controls the delay time such that a change point of a first optical waveform of a first channel is away from a data decision timing of a second optical waveform of a second channel, using information acquired from an electrical signal produced after photodetection,
    wherein the processor controls the delay time so as to bring the change point of the first optical waveform of the first channel to be in time-alignment with a change point of the second optical waveform of the second channel, and
    wherein the processor receives signal reception quality information of each of the multiple channels and controls the delay time in the delay adjuster circuit based on the signal reception quality information.

7. The optical receiver as claimed in claim 1, further comprising:
    amplifiers each provided on a corresponding channel of the multiple channels and configured to produce an electric voltage signal from an output of a corresponding photodetector of the photodetectors,
    wherein the amplifiers of the multiple channels are integrated in a single unit.

8. An optical transceiver comprising:
    the optical receiver as claimed in claim 1; and
    an optical transmitter.

9. A control method of reception of optical signals, comprising:
    receiving at an optical receiver an optical signal on each of multiple channels;
    detecting the optical signal and producing an electrical signal for each of the multiple channels; and
    based upon information acquired from the electrical signal, controlling a delay time of an optical waveform of an incoming signal for each of the multiple channels such that a change point of a first optical waveform of a first channel is away from a data decision timing of a second optical waveform of a second channel,
    wherein a bit error rate of each of the multiple channels is received and the delay time is controlled so as to minimize the bit error rate of said each of the multiple channels.

10. The control method as claimed in claim 9, wherein the controlling of the delay time is performed on the optical waveform to be input to a photodetector that detects the incoming signal on said each of the multiple channels such that the change point of the first optical waveform of the first channel is time-aligned with a change point of the second optical waveform of the second channel.

11. The control method as claimed in claim 9, further comprising:
    producing a timing signal for data decision from the electrical signal for each of the multiple channels; and
    controlling the delay time of the optical waveform based upon the timing signal for each of the multiple channels.

12. A control method of reception of optical signals, comprising:
    receiving at an optical receiver an optical signal on each of multiple channels;
    detecting the optical signal and producing an electrical signal for each of the multiple channels;
    based upon information acquired from the electrical signal, controlling a delay time of an optical waveform of an incoming signal for each of the multiple channels such that a change point of a first optical waveform of a first channel is away from a data decision timing of a second optical waveform of a second channel, and
    acquiring information representing a signal reception quality from the electrical signal for each of the multiple channels,
    wherein the delay time of the optical waveform of the incoming signal is controlled based upon the signal reception quality, and
    wherein the controlling of the delay time is performed on the optical waveform to be input to a photodetector that detects the incoming signal on said each of the multiple channels such that the change point of the first optical waveform of the first channel is time-aligned with a change point of the second optical waveform of the second channel.

13. An optical transceiver comprising:
the optical receiver as claimed in claim 6; and
an optical transmitter.

\* \* \* \* \*